Aug. 18, 1936.  E. F. MACTAGGART ET AL  2,051,452
PROCESS AND APPARATUS FOR THE MANUFACTURE OF PLASTERBOARD
Filed Oct. 17, 1935  6 Sheets-Sheet 2

Inventors
Edmonds Frank Mactaggart
and Oliver Margetson
By [signature]
Attorneys Aug. 18, 1936.  E. F. MACTAGGART ET AL  2,051,452
PROCESS AND APPARATUS FOR THE MANUFACTURE OF PLASTERBOARD
Filed Oct. 17, 1935    6 Sheets-Sheet 4

Inventors
Edmonds Frank Mactaggart
Oliver Margetson
By Blair Kilcayne
Attorneys

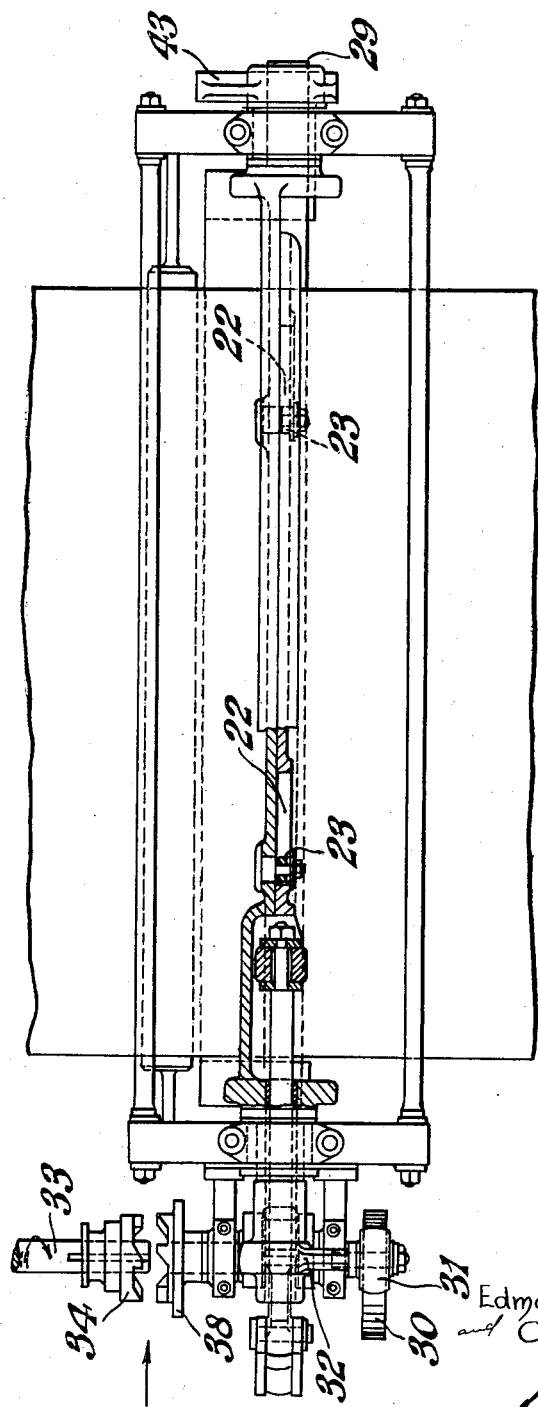

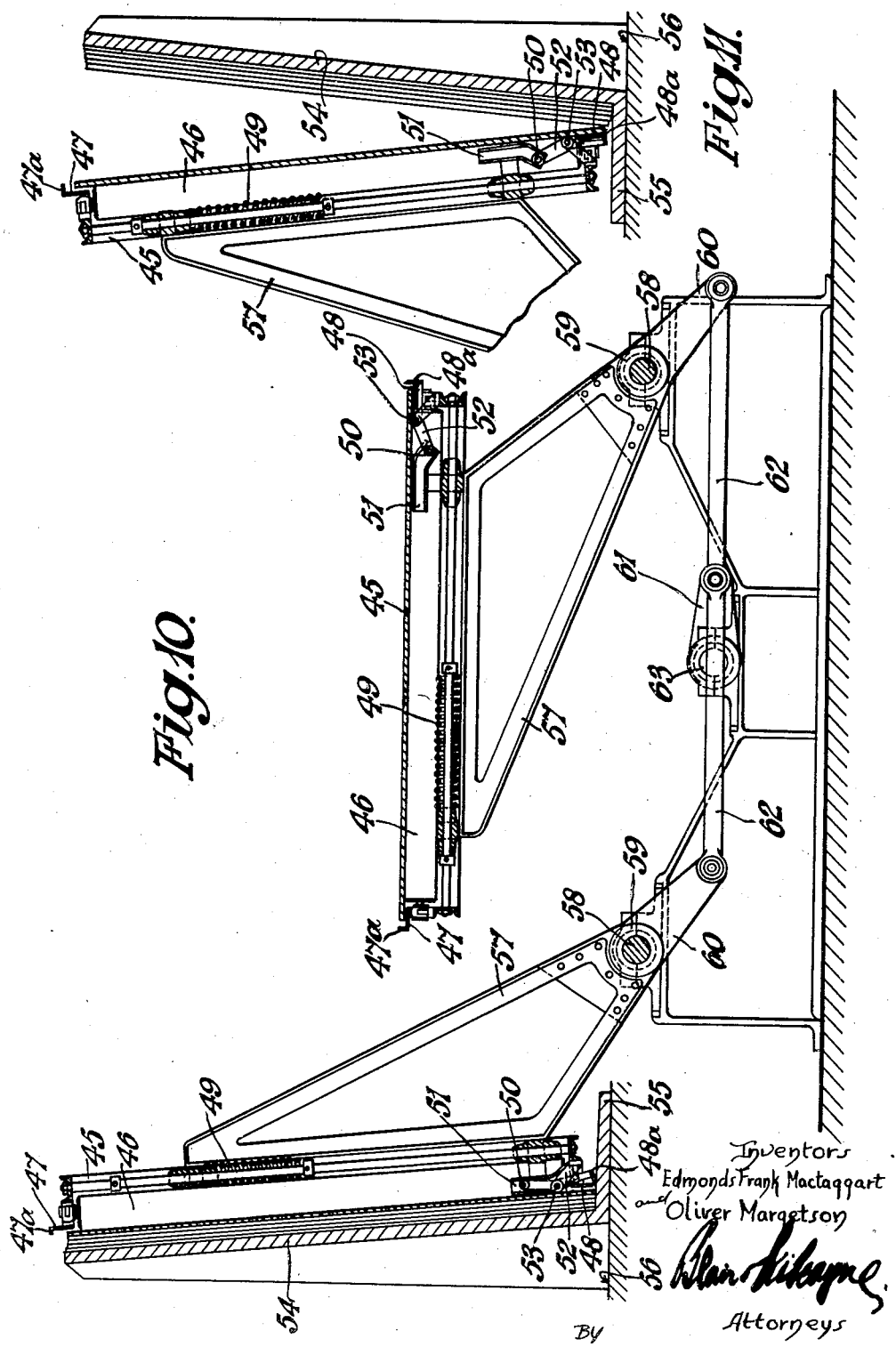

Patented Aug. 18, 1936

2,051,452

UNITED STATES PATENT OFFICE 2,051,452

PROCESS AND APPARATUS FOR THE MANUFACTURE OF PLASTERBOARD

Edmonds Frank Mactaggart, London, and Oliver Margetson, Lancashire, England

Application October 17, 1935, Serial No. 45,486
In Great Britain August 20, 1934

21 Claims. (Cl. 154—2)

This invention relates to the manufacture of plasterboard both of the usual commercial variety consisting of a layer of plaster interposed between two sheets of paper, cardboard or the like and of the kind having an additional exposed layer of plaster applied during manufacture to supersede the plaster facing normally applied by hand to the more usual type of board by a plasterer after erection.

Plasterboard is now usually manufactured by distributing wet plaster mixed with an accelerating agent over the upper surface of a strip of paper which is passed between pressure rollers under the upper one of which another strip of paper is passed and pressed against the wet plaster beneath it.

This method of manufacturing plasterboard has two distinct disadvantages. The first disadvantage is that by applying the plaster in a wet condition to the paper an excess of water has to be used to bring the plaster to a condition in which it can be worked. A relatively large proportion of this water has to be removed before the plasterboard can safely be handled and this removal on account of the time required and the process involved adds considerably to the cost of its production. The second disadvantage, also arising out of the application of wet plaster to the sheet of paper, is that the second, and subsequently applied sheet of paper has the tendency to peel away from the layer of plaster when the board has been finally dried.

One of the objects of the present invention is to provide a new and improved process for the manufacture of plasterboard which will obviate the above disadvantages.

A further object of the invention is to provide improved apparatus for the purpose.

In the process according to the present invention the plaster is delivered in the dry state to the surface of the sheet of paper or the like after which it is spread over such surface in the form of a comparatively thin layer. This layer is then moistened by the application of the minimum quantity of water necessary to produce ultimate setting.

Broadly therefore the present invention may be said to consist of a process for the manufacture of plasterboard according to which the plaster is applied in a dry state to a supporting sheet of paper, cardboard or the like on which it is spread in the form of a layer which layer is then moistened, the thickness of each layer so applied being such as to permit the subsequently applied moisture to penetrate evenly therethrough.

Where the final thickness of plaster is greater than a comparatively thin layer, as in the ordinary commercial plasterboard, it is preferred to build the same up by the successive application of a plurality of thin layers of dry plaster, each dry layer being moistened either by spraying with liquid or from moisture derived from the preceding layer before the application of the next succeeding layer and so on throughout the series until the required thickness of plaster has been built up.

Whilst the invention is not limited to manufacturing plasterboard by the continuous method this method is preferred and in order that the invention may be clearly understood and carried into effect apparatus operating according to such continuous method will now be described by way of example, by aid of the accompanying drawings in which:—

Figs. 1 and 1a illustrate diagrammatically a complete plant operating in accordance with the present invention and designed for the manufacture of the improved kind of plasterboard having an additional exposed layer but capable also of use with or without modification for the production of the usual type of board.

Fig. 7 is a plan view of the mechanism illustrated in Fig. 5.

Fig. 10 and Fig. 11 are end views partly in section of the mechanism for discharging and stacking the severed boards.

Figure 1:
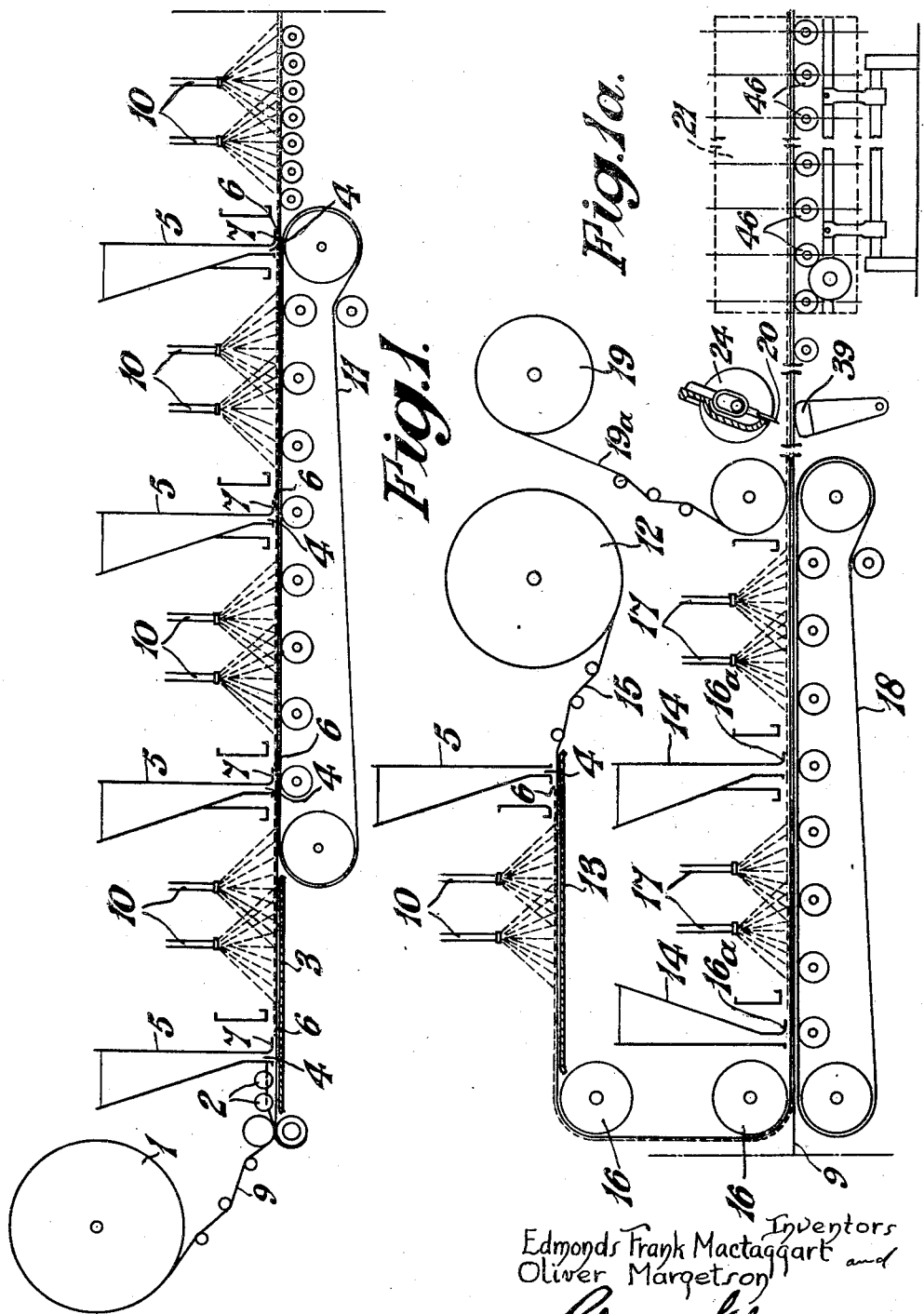
Figure 2:
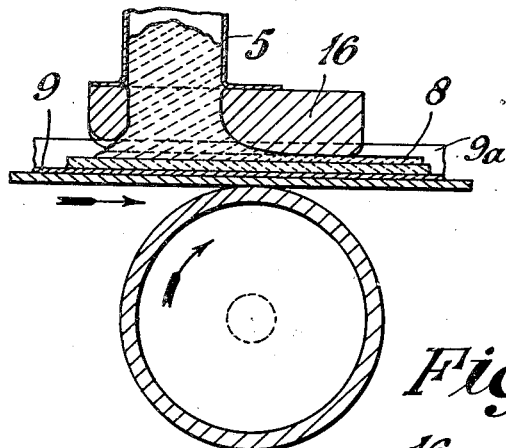
Fig. 2 is a sectional view to an enlarged scale of the means employed in this embodiment for delivering dry plaster to each sheet of paper or the like and for spreading the same thereon.
Figure 3:
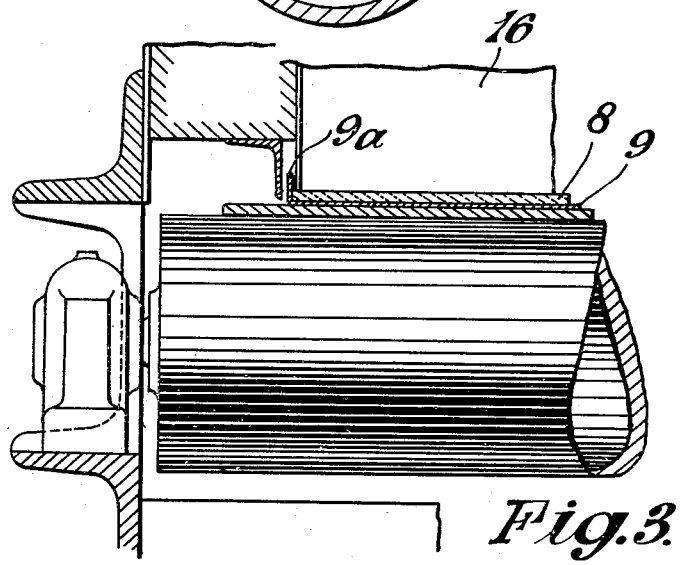
Fig. 3 is a part sectional front elevation of one end of the same.
Figure 4:
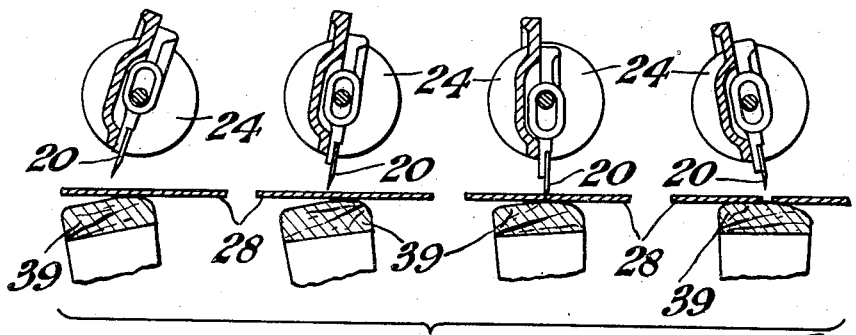
Fig. 4 is a diagrammatic view illustrating four positions of the guillotine blade used to effect severance of the completed board.
Figure 5:
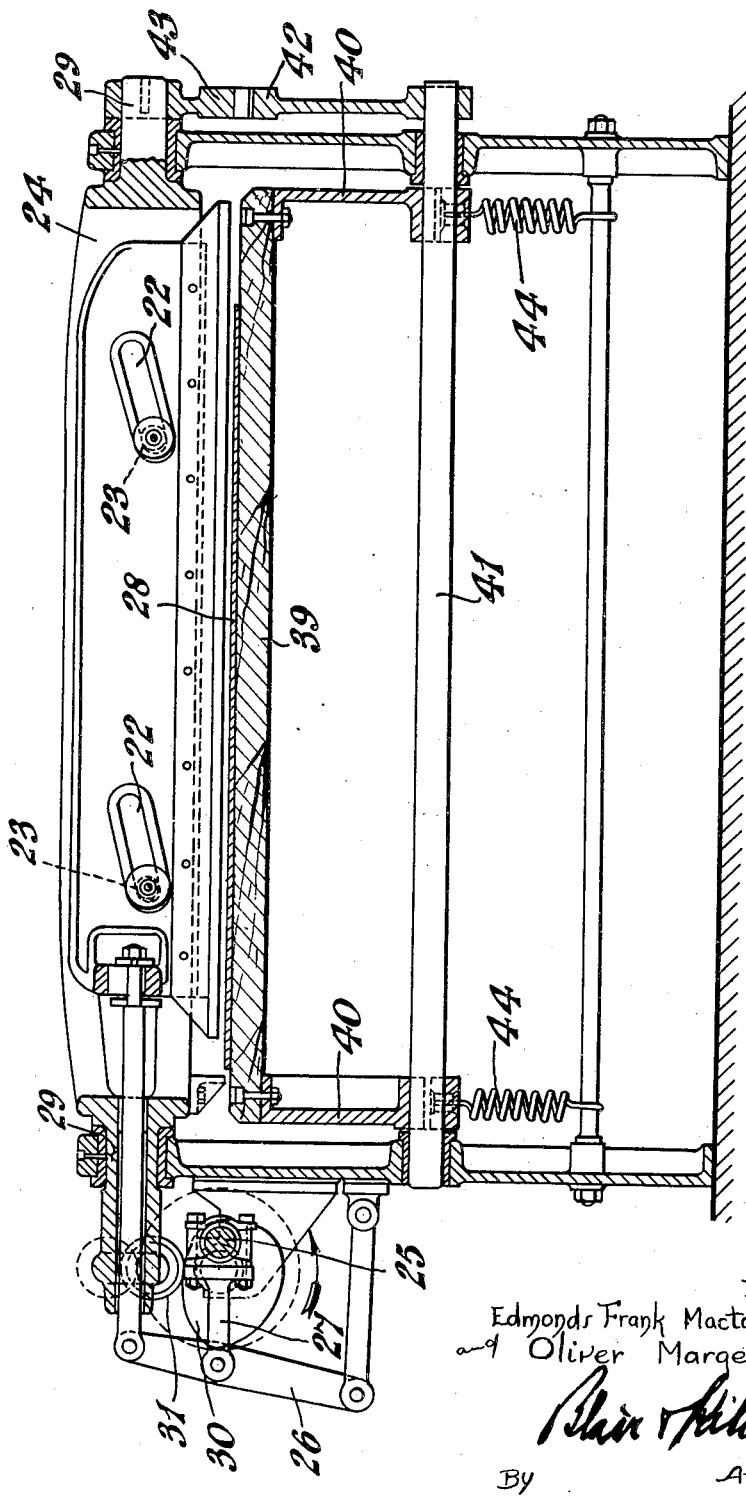
Fig. 5 is a cross section showing the guillotine knife and its operating mechanism.
Figure 6:
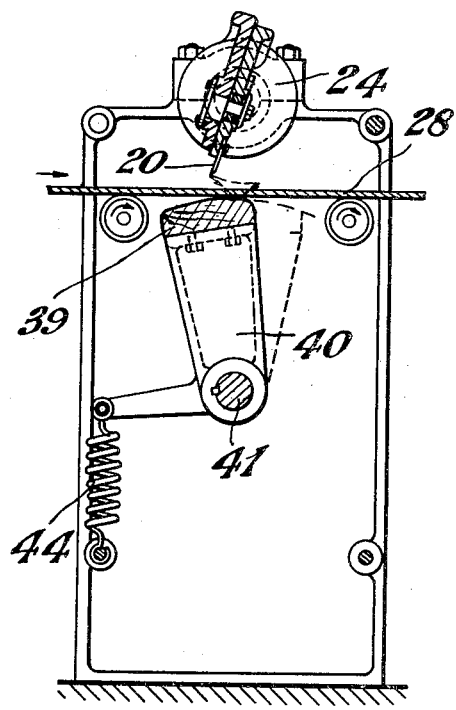
Fig. 6 is a transverse section through the same.
Figure 8:
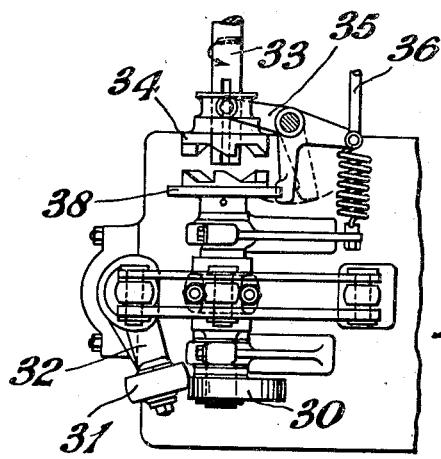
Fig. 8 is a view looking in the direction of the arrow shown in Fig. 7.
Figure 9:
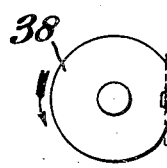
Fig. 9 is a detail view of the locking device shown in Fig. 8.

The plant constituting the embodiment of the present invention and illustrated generally in Figs. 1 and 1a comprises a spool of paper 1 which is fed by means of feed rollers 2 onto the upper surface of a platen 3. The dry plaster is fed on to the upper surface of the paper through an outlet 4 at the lower end of a hopper 5. The mouth of this outlet is constituted by an orifice 6 formed in a spreader 7, the end surface of such spreader 7 at the forward side of the orifice being inclined as shown most clearly in Fig. 2 and extended forward for the purpose of effecting both the spreading and the partial compression of the delivered dry plaster to form a thin layer 8 across the full breadth of the paper sheet 9. For the purpose of keeping this layer of plaster within the confines of the paper sheet the longitudinal edges of the same are upturned as at 9a in Figs. 2 and 3. These upturned edges are subsequently removed from the completed boards in known manner.

The thin layer of plaster 8 as it emerges from under the spreader 7 passes beneath water sprays 10. These sprays deliver the water in a finely divided condition over the whole width of the plaster layer and in quantity such as to moisten the plaster evenly throughout its thickness without excess. This can be gauged in practice by watching for the plaster to change its colour from the normal white of the dry plaster to a pinkish hue attained when the same has been sufficiently moistened. We have found from experiment that it is essential that the layer of plaster 8 shall not be unduly thick as it is required that the absorption of the water shall take place both upwards from the surface of the paper sheet as well as downwards. This effect can only be attained satisfactorily when the layer of plaster is comparatively thin.

In the present apparatus the required final thickness of plaster is built up on the paper sheet by the successive application of a plurality of such thin layers of dry plaster each dry layer being moistened before the application of the next succeeding layer either by spraying from above and absorption from below or by absorption alone if such is found to be sufficient and so on throughout the series until the required thickness of plaster has been built up. In the plant illustrated in Figs. 1 and 1a of the drawings this is effected by carrying the paper sheet by means of an endless conveyor 11 beneath a succession of hoppers 5, spreaders 7 and sprays 10, five such sets being illustrated for this purpose. It will, however, be apparent that this number may either be reduced or increased according to requirements.

With the plant illustrated the plaster on the lower paper sheet is only built up to a proportion of the final thickness, the additional layer or layers being applied to the surface of the upper paper sheet. In the present example a single layer of plaster only is applied to the upper paper sheet the fifth set in the series of hoppers etcetera being employed for this purpose. This arrangement is shown in Fig. 1a and the apparatus for the purpose comprises a further spool of paper 12 and a further platen 13 mounted above a further pair of hoppers 14 hereafter to be described. The paper sheet delivered on to the surface of the platen 13, and referred to by the reference numeral 15, after passing beneath the hopper 5 etcetera of the fifth set of hoppers for the application of a single layer of plaster is carried downwards over guide rollers 16 and turned inwards above the first mentioned paper sheet 9 so as to bring the layers of plaster of the two sheets together face to face to permit the same to combine and form the final thickness of plaster with the two paper sheets forming the outside layers.

As the thickness of plaster in a completed board is built up layer by layer it is essential that the setting or drying of the layers shall be approximately uniform otherwise warping of the board will occur. This may be effected either by varying the amount of moisture applied to each layer so that the first applied layer shall have a greater moisture content than the last applied layer or by the predetermined use of retarders or accelerators whichever method is employed the object in each case is to ensure that all layers set or dry approximately together.

To convert the usual type of board into the improved type further layers of plaster are applied in succession to the upper surface of the paper sheet 15. For this purpose an additional pair of hoppers 14 are provided with their associated spreaders 16a and sprays 17. The continued forward movement of the plaster board during the application of these two further layers of plaster is assisted by a further endless conveyor 18. To protect this outer layer of plaster against damage the same may be covered by a layer of thin paper sheet supplied from a spool 19, such paper being of a glazed character to prevent the same from adhering permanently to the surface of the platen.

The board thus completed continues to feed forward until it comes beneath a guillotine knife blade 20, the operation of which is so synchronized as to cut the board into sections of the required length. The cut sections are then fed forward above the discharging mechanism indicated generally at 21 which operates both to discharge the same laterally and to stack the severed boards on end on both sides of the machine.

The mechanism for severing the boards into lengths and for discharging and stacking the same will now be described in the order mentioned by reference to Figs. 4–9 and 10 respectively.

*Cutting mechanism*

The cutting mechanism illustrated in Figs. 4–9 comprises a guillotine knife blade 20. This blade which extends transversely of the machine and the full width of the board to be cut is mounted to have a combined lateral, downward, and circular movement during each cutting operation. For this purpose the blade is formed with inclined slots 22 which are engaged by pins or rollers 23 carried by a yoke or frame 24. The required lateral movement is imparted to the blade by means of a crank 25 through a lever and connecting rod 26 and 27 respectively. In consequence of this lateral movement, and the engagement of the rollers 23 in the inclined slots 22, the blade is given simultaneously with the lateral movement, a downward movement towards the upper surface of the positioned board, which is indicated in the figures by the reference numeral 28. Owing to the fact that the board to be cut has a continuous forward motion and as this would result in the plaster being heaped up by the knife blade during the cutting operation were not a further movement provided, the knife blade at the same time as it approaches the board is given a circular motion in the direction of travel of the board the speed of the two movements being synchronized so that during cutting there is no relative movement between the knife blade and the board apart from the lateral movement of the knife blade. By this combination of three movements the knife blade is able to cut cleanly through the plasterboard without disturbing the plaster layers which it must be remembered are still in a plastic condition.

The above mentioned circular motion is imparted to the knife blade through the yoke 24 which for this purpose is mounted at each end upon trunnions 29 about which the yoke is oscillated. This oscillatory motion is simultaneously imparted to the knife blade through the connection afforded by the rollers 23.

The above mentioned oscillatory movement is applied to the yoke 24 at the required intervals through a cam 30 and a roller 31 mounted on the end of a rocking arm 32, such rocking arm in turn being mounted upon the outer end of one of the trunnions 29. This cam 30 is driven from the same shaft as the crank 25 and such shaft receives its intermittent rotation from a continuously driven shaft 33 through a clutch 34. This clutch device 34 is engaged and disengaged automatically through the medium of an operating lever 35, and such lever in turn is operated from a suitable mechanism not shown, through a connecting rod 36. Extending from the lever 35 is an arm 37 the outer end of which is adapted to engage in a gap formed in the periphery of the flange 38 of one of the clutch members 34 so as to lock the shaft which operates the cam 30 and associated mechanism against movement when the clutch is disengaged. This locking mechanism is shown in detail in Figs. 8 and 9.

During each cutting operation the plasterboard is supported by a wood or other suitable block 39 mounted upon the upper end of a quadrant 40. This quadrant with the block is given a forward movement equivalent to and synchronized with the circular movement of the knife blade so as to follow the plasterboard in its forward movement whilst cutting is being effected and thus provide a continuous support for the underside of the board whilst it is being cut without imposing any retarding action on the board. This forward motion of the quadrant 40 is imparted through the shaft 41 on which it is mounted by means comprising a pair of toothed sectors 42 and 43, the sector 42 being mounted upon the shaft 41 and the sector 43 being mounted upon one of the trunnions 29. By this means the two motions of the quadrant 40 and the yoke 24 are synchronized. The return motions of the quadrant and the yoke are effected through the same connection by the springs 44.

*Discharging and stacking mechanism*

This mechanism which is illustrated in Fig. 10 and Fig. 11 comprises a pair of tables or platforms adapted to be moved in alternation into and out of a horizontal position in alignment with the track along which the completed boards are conveyed.

In the particular example illustrated each table consists of a rectangular frame 45 between the sides of which are revolubly mounted a plurality of rollers 46. These frames are secured to rods 45a which are slidably mounted in bearings 46a carried by brackets 57 the operation of which is hereafter described.

The upper surface of each frame is formed or provided with narrow platforms 47 and 48 along each lateral side, each such platform having an upstanding portion 47a and 48a respectively operating to centralize each severed board as it is received. The platforms 47 and 48 are fixtures whilst the upstanding portion 48a is movable to effect the release of the board in each stacking position. To effect this release of the board the portion 48a is attached to one end of a lever 52 which is pivotally mounted to the frame at 53, the other end of the lever carrying a cam roller 50 which operates in a cam groove 51 carried by the bracket 57. When each table approaches the stacking position in the manner hereafter described the portion 48a engages with the base 55 thereby causing the rods to slide upwards in the bearings 46a against the action of the spring 49. This upward movement of the frame therefore causes the roller 50 to ride up the cam groove 51 and thereby rotate lever 52 which consequently effects the withdrawal of the upstanding portion 48a from beneath the lower edge of a positioned board. When the frame is again returned to the horizontal position the released spring returns them to the normal position causing the roller 50 to move down the cam groove and return the upstanding portion or foot 48a to its normal position.

In the present example the discharged boards are adapted to be stacked on edge and face to face against the inclined surface of a cradle 54, the base of which 55 is permitted to slide upon the supporting surface 56. By this means the cradle 54 is pushed back a distance equal to the thickness of a single board at each stacking operation, thus permitting each table to assume the same position preparatory to the stacking of each board.

So that each table may be swung into and out of the horizontal position in alteration each such table is supported upon a pair of brackets 57, one only of which is illustrated in Fig. 10 and Fig. 11 of the drawings. Each pair of brackets is mounted upon a shaft 58 and such shaft is supported by pedestal bearings 59. Beyond each bearing is an extension arm 60 attached to or otherwise forming a fixed part of each bracket 57, such arms being coupled in pairs by their outer extremities and to a crank 61 by means of a coupling rod 62. The shaft 63 carrying the cranks 61 is adapted to be intermittently rotated so as to synchronize with the operation of the aforementioned cutting mechanism and in its rotation to cause one table to move into the horizontal or receiving position and the other table simultaneously to move from the receiving position to the discharging or stacking position.

As the speed at which the severed boards are conveyed from the cutting mechanism to the discharging mechanism must be a measure of the time taken for one discharge table to come into the receiving position whilst the other table is moving to the stacking position, the movement of each board as it approaches the discharge mechanism must be increased. This can be effected by positively driving the conveying rollers which are situated adjacent to the discharge mechanism and causing the same to be rotated at the required increased speed so that a gap is always maintained between the board which is about to travel onto the discharge table and the board next behind it. Similarly one or more of the rollers 46 may be positively driven either at the normal conveying speed or at the increased speed.

As the present invention involves a new or improved process of applying a thickness of plaster to a paper or other sheet it will be obvious that the same is not limited to the manufacture of the more usual kind of plasterboard consisting of a layer of plaster interposed between two sheets of paper or the like as the same is also applicable for use in the manufacture of a plasterboard consisting of a layer of plaster having a backing of paper or the like on one face only.

What we claim is:—

1. Process for the manufacture of plasterboard comprising the steps of applying successive layers of plaster in a dry state to a supporting sheet of paper, cardboard or the like, spreading the dry plaster on the supporting sheet to form a layer and applying liquid to each such applied layer of dry plaster to moisten the same sufficiently to cause the plaster eventually to set, the thickness of each layer of plaster so applied being such as to permit the subsequently applied moisture to penetrate evenly therethrough.

2. Process for the manufacture of plasterboard according to which the desired final thickness of plaster is built up on a supporting sheet of paper, cardboard or the like by the successive application of a plurality of layers of dry plaster each dry layer being moistened before the application of the next succeeding layer and so on throughout the series until the required thickness of plaster has been built up.

3. Process for the manufacture of plasterboard comprising the steps of building up the required thickness of plaster by the successive application of comparatively thin layers each layer being formed by spreading dry plaster over a supporting surface and subsequently allowing the same to absorb sufficient moisture to cause setting each said layer being treated to ensure that all layers set or dry at approximately the same time to prevent warping.

4. Process for the manufacture of plasterboard wherein the plaster, equivalent only to a part of the total finished thickness, is applied to one of the opposing sheets of paper, cardboard or the like, the plaster equivalent to the remainder of the required final thickness being applied to the other and opposite sheet of paper, cardboard or the like, and applying moisture to the plaster, the board being completed with the paper or the like sheets on the outside by bringing the two plaster surfaces together whilst the same are in a moist condition.

5. Process for the manufacture of plasterboard comprising the steps of applying successive layers of plaster in a dry state to a supporting sheet of paper, cardboard or the like, spreading and compressing the dry plaster on the supporting sheet to form a layer and applying liquid to each such applied layer of dry plaster to moisten the same sufficiently to cause the plaster eventually to set, the thickness of each layer of plaster so applied being such as to permit the subsequently applied moisture to penetrate evenly therethrough.

6. Process for the manufacture of plasterboard according to which the desired final thickness of plaster is built up on a supporting sheet of paper, cardboard or the like by the successive application of a plurality of layers of dry plaster each dry layer being compressed and moistened before the application of the next succeeding layer and so on throughout the series until the required thickness of plaster has been built up.

7. Process for the manufacture of plasterboard according to which dry plaster, equivalent only to part of the total finished thickness, is applied as one or more layers by a spreading operation to one of the opposing sheets of paper, cardboard or the like each said layer being moistened before the application of a further layer the plaster equivalent to the remainder of the required final thickness being similarly applied to the other and opposite sheet of paper, cardboard or the like, the board being completed with the paper or the like sheets on the outside by bringing the two plaster surfaces together whilst the same are in a moist condition.

8. Continuous process for the manufacture of plasterboard comprising the delivery of dry plaster onto the upper surface of a continuously moving sheet of paper, cardboard or the like, and utilizing said moving sheet to carry said dry plaster firstly beneath a stationary surface to effect the spreading and partial compression of the plaster into a relatively thin layer and secondly to carry said layer beneath one or more sprays of liquid for the purpose of giving to the same the required moisture content, said operations being repeated when necessary one or more times until the required thickness of plaster has been applied, and repeating the operations one or more times on the upper surface of a second continuously moving sheet of paper, cardboard or the like and finally bringing the two thicknesses of moistened plaster together to cause the same to combine into a layer of the required final thickness between the two sheets of paper, cardboard, or the like.

9. Process for the manufacture of plasterboard comprising the steps of applying plaster in successive layers to one supporting sheet of paper, cardboard or the like to build up a depth of plaster equal to a part only of the final thickness of plaster in the completed board applying plaster also in successive layers to a further supporting sheet of paper, cardboard or the like to build up a depth of plaster sufficient to make up the remaining part of the required final thickness of plaster in the completed board, applying moisture to the plaster, and completing the board with the paper or like sheets on the outer sides by bringing the two plaster surfaces together whilst the same are in a moist condition.

10. Process for the manufacture of plasterboard comprising the steps of building up a thickness of moistened plaster on one supporting sheet of paper, cardboard or the like by the application in succession of a plurality of thin layers, each layer being formed by depositing dry plaster onto the supporting surface and subsequently spreading, compressing and moistening the same before the application of the next layer repeating the operations on a further supporting sheet of paper, cardboard or the like and completing the board with the paper or like sheets on the outer sides by bringing the two plaster surfaces together whilst the same are in a moist condition.

11. Continuous process for the manufacture of plasterboard comprising the steps of delivering dry plaster onto the upper surface of a continuously moving sheet of paper, cardboard or the like, and utilizing said moving sheet to carry said dry plaster firstly beneath means for spreading the same evenly over the sheet to form a layer and secondly to carry said layer beneath means for applying moisture thereto, said operations being repeated until the required thickness of plaster has been applied.

12. Continuous process for the manufacture of plasterboard comprising the delivery of dry plaster onto the upper surface of a continuously moving sheet of paper, cardboard or the like, and utilizing said moving sheet to carry said dry plaster firstly beneath an inclined stationary surface to effect the spreading and partial compression of the plaster into a relatively thin layer and secondly to carry said layer beneath one or more sprays of liquid for the purpose of giving to the same the required moisture content, said operations being repeated one or more times until the required thickness of plaster has been applied.

13. Process for for the manufacture of plasterboard comprising the step of applying an additional and exposed thickness of plaster to one of the outer paper or the like surfaces of a completed plasterboard by spreading and compressing dry plaster onto said paper or like surface and moistening the spread and compressed layer to cause eventual setting of the plaster, the application of said layers being repeated until the required thickness of plaster has been attained.

14. Process for the production of plasterboard consisting in forming a thickness of plaster between two outer layers of paper, cardboard or the like by spreading and then moistening dry plaster and applying a further thickness of plaster to the exposed exterior surface of one of said sheets of paper, cardboard or the like by similarly spreading and moistening dry plaster.

15. Process for the production of plasterboard consisting in building up a thickness of plaster between two outer layers of paper, cardboard or the like by the application in succession of a plurality of thin layers of plaster each said layer being formed by spreading and compressing dry plaster and moistening the same before the application of the next layer and building up a further thickness of plaster on the exposed exterior surface of one of said sheets of paper, cardboard or the like by a similar application of a succession of layers.

16. Apparatus for use in the manufacture of plasterboard comprising in combination means for delivering two continuous sheets of paper, cardboard or the like, means for delivering successive layers of dry plaster onto the surface of both said sheets, means for spreading the dry plaster so delivered to form comparatively thin layers, means for applying liquid to each said layer for the purpose of giving to the plaster the required moisture content and means for completing the board with the paper or the like on the outer sides of an interposed thickness of plaster.

17. Apparatus for use in the manufacture of plasterboard comprising in combination means for delivering two continuous sheets of paper, cardboard or the like, means for delivering successive layers of dry plaster onto the surface of both said sheets, means for spreading the dry plaster so delivered to form a comparatively thin layer, means for applying liquid to each said layer for the purpose of giving to the plaster the required moisture content and further means for applying an additional thickness of plaster to one outer face of the completed board to provide the usual plaster facing on an erected structure.

18. Apparatus for use in the continuous manufacture of plasterboard comprising means for delivering and for conveying in a continuously forward direction a supporting sheet of paper, cardboard or the like, means for delivering dry plaster onto the upper surface of said supporting sheet, a stationary surface arranged at a predetermined height above the surface of the moving supporting sheet for spreading the delivered dry plaster evenly thereover, means for spraying the spread layer of dry plaster with liquid and further equivalent means for delivering and conveying a second continuously moving sheet of paper, cardboard or the like and for applying thereto a further thickness of plaster subsequently to be superimposed and combined with the first applied thickness of plaster to make up the final thickness of plaster between the two sheets of paper, cardboard or the like.

19. Apparatus for use in the manufacture of plasterboard comprising in combination means for delivering paper, cardboard or the like, means for delivering successive layers of dry plaster onto the surface of said paper or the like, means for spreading the dry plaster so delivered to form a comparatively thin layer and means for applying liquid when required to each such applied layer for the purpose of giving to the plaster the required moisture content.

20. Apparatus for use in the continuous manufacture of plasterboard comprising in combination a conveyor, means for continuously feeding a length of paper, cardboard or the like onto said conveyor, means for feeding successive layers of dry plaster onto the upper surface of said moving length of paper or the like said means being disposed at spaced intervals above the sheet, means associated with the outlet of each dry plaster-feeding means for spreading and compressing the delivered plaster in the form of a thin layer means disposed after each plaster delivery means for spraying the spread dry plaster layer with liquid, further means for feeding a further continuous length of paper or the like, further means for applying and spreading dry plaster over said further length of paper or the like and for moistening the same when spread, and means for causing said further length of paper or the like to turn in and superimpose onto the first mentioned length of paper or the like so as to bring the two plaster surfaces together in a moist condition and the two sheets of paper or the like on the outer sides of the plaster.

21. Apparatus for use in the continuous manufacture of plasterboard comprising in combination a conveyor, means for continuously feeding a length of paper, cardboard or the like onto said conveyor means for feeding successive layers of dry plaster onto the upper surface of said moving length of paper or the like said means being disposed at spaced intervals above the sheet, means associated with the outlet of each dry plaster feeding means for spreading and compressing the delivered plaster in the form of a thin layer means disposed after each plaster delivery means for spraying the spread dry plaster layer with liquid, further means for feeding a further continuous length of paper or the like further means for applying and spreading dry plaster over said further length of paper or the like and for moistening the same when spread, means for causing said further length of paper or the like to turn in and superimpose onto the first mentioned length of paper or the like so as to bring the two plaster surfaces together in a moist condition with the two sheets of paper or the like on the outer sides of the plaster, and further means for applying a thickness of plaster to the outside surface of the completed board by the spreading thereover of dry plaster and its subsequent moistening.

EDMONDS FRANK MACTAGGART.
OLIVER MARGETSON.